United States Patent

[11] 3,563,220

| [72] | Inventor | Walter L. Garner<br>Norwalk, Calif. (c/o Trans-Dapt of<br>California, Inc., P.O. Box 4157, Compton, Calif. 92024) |
|---|---|---|
| [21] | Appl. No. | 854,374 |
| [22] | Filed | Sept. 2, 1969 |
| [45] | Patented | Feb. 16, 1971 |

[54] CARBURETOR-MANIFOLD ADAPTER
10 Claims, 11 Drawing Figs.

[52] U.S. Cl. .................................................. 123/127, 123/52, 123/59
[51] Int. Cl. ........................................................F02m 13/06; F02b 75/20, F02b 75/18
[50] Field of Search ........................................... 123/59, 52 (MV), 52 (M), 127

[56] References Cited
UNITED STATES PATENTS

| 2,192,067 | 2/1940 | Betry ........................... | 123/127 |
| 2,536,716 | 1/1951 | Bonser ....................... | 123/127 |
| 2,647,502 | 8/1953 | Braun .......................... | 123/127 |
| 2,762,350 | 9/1956 | Mann et al. ................. | 123/52X |
| 2,938,507 | 5/1960 | Burnell ...................... | 123/52 |

Primary Examiner—Wendell E. Burns
Attorney—Georges A. Maxwell

ABSTRACT: An adapter to facilitate mounting a pair of two venturi carburetors on an intake manifold designed to mount one 4 venturi carburetor, so that said pair of carburetors are arranged in close, interengaged relationship with each other, with their outlets in as close proximity to and in as close to register with the inlet of the manifold as is operatively feasible and practical.

PATENTED FEB 16 1971

Inventor
Walter L. Garner
By
George A. Tunnell
Attorney

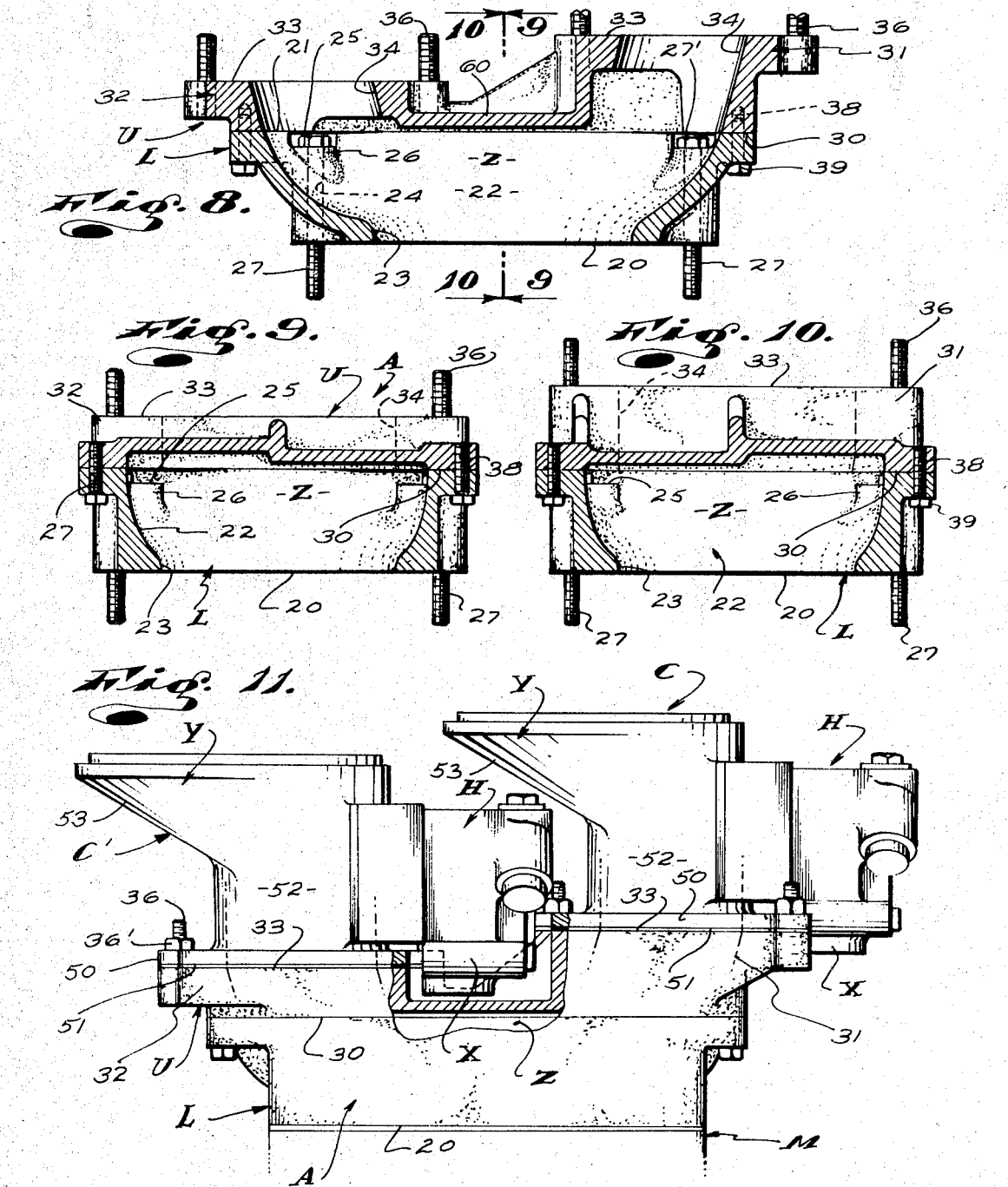

CARBURETOR-MANIFOLD ADAPTER

This invention has to do with the air fuel intake means for internal combustion engines and is more particularly concerned with an adapter for effectively relating a pair of two venturi carburetors with an intake manifold designed to be cooperatively related with a four-venturi carburetor.

In the automobile industry considerable time, effort and expense is directed to obtaining maximum performance and efficiency from or out of the automobile engines. In past years the enhancing of automobile engine performance, over that which the automobile manufacturers imparted into their products, was carried out by professional and amateur automobile racing enthusiasts and the small independent manufacturers of automotive specialty equipment. The efforts and results of such work was and still is, but to a lesser extent than before, referred to as "hopping up" of original manufacturers equipment.

As regards the efforts of the prior art to "hop up" original or stock automobile engines, much effort was directed to the air fuel intake means and systems of automobile engines. These efforts resulted in the manufacture and sale of especially designed and costly intake manifolds which were capable of effectively handling larger volumes of air than stock manifolds and which were most frequently designed to make possible the effective use of two stock carburetors. Such manifolds were, as a general rule, designed for maximum engine performance, with little or no regard for efficiency or fuel economy, with the result that they were ideally suited for competition or racing and were not suited for ordinary, day-to-day use on public roads and highways. In spite of the practical limitations of use for such equipment, it was widely used for ordinary operation and day-to-day road use.

As a result of the above and to meet the market demands for increased engine performance, the automobile manufacturers have developed and now provide optional high performance carburetion and manifolding for their engines, which carburetion and manifolding makes available to the public that which was previously provided by the special equipment manufacturers alone.

The above development of high performance equipment by the automobile manufacturers has developed along one line, which is the establishment of larger capacity, single carburetor manifolds and the provision of larger capacity carburetors for use in connection therewith. The larger capacity carburetors thus provided are three and four venturi units as distinguished from standard carburetors which have but two venturi, and the larger capacity manifolds are specially designed to accommodate the noted four venturi carburetors and are such that standard two-venturi carburetors cannot be related thereto. The four-venturi carburetors vary in capacity from about 600 cubic feet per unit to about 900 cubic feet per minute and are reasonably efficient units. Competition, large capacity carburetors with capacities of from 950 to 1,050 cubic feet per unit are provided for use on or in connection with manifolds for four-venturi carburetors. These carburetors distinguish from conventional four-venturi carburetors in that they are provided with but three venturis, one of which is a large, elongated venturi which is like two-venturi of a four-venturi carburetor connected and in opening communication with each other.

The above noted three-venturi carburetors are extremely inefficient as the enlarged venturi constitute little more than a receiver passage into which raw gas is dumped and is substantially nonresponsive to those gas metering means employed to gain carburetion efficiencies.

The noted three-venturi competition type of carburetors referred to above, in addition to being inefficient are extremely costly.

The high performance manifolds for use in connection with four-venturi carburetors and which are produced by automobile manufacturers are carefully and well-designed units and are effective and efficient to handle the volume of flow for which all three- and four-venturi carburetors are designed to handle. That is, they will effectively and efficiently handle flow of fuel and air from 600 to 1,050 or more cubic feet per unit. In this respect, such manifolds are superior to those manifolds produced by manufacturers of racing equipment and the like and which are only efficient and truly effective when a large and maximum flow is conducted therethrough.

There is a growing demand by owners of automobile equipment with small capacity four-venturi carburetors and related manifolds to increase the flow capability of their carburetion systems to as much as is effected by the noted three-venturi-type of competition carburetors. Such demand, prior to the present invention, could only be accomplished by replacing the small capacity carburetors with a larger, costly and inefficient three-venturi competition carburetor, such as referred to above or by replacing the entire carburetion system with a costly, specially designed, multiple carburetor manifold with appropriate related carburetors which, in addition to being more costly than utilization of a three-venturi carburetor, is even less efficient.

At the present time, Holley Carburetor Company, doing business at 11955 E. Nine Mile Road, Warren, Michigan, produces a two-venturi 500 cubic foot per minute (c.f.m.) carburetor which has fast become recognized as the most effective and efficient carburetor manufactured in the United States.

This carburetor, in addition to being extremely efficient, is extremely inexpensive as compared with larger three- and four-venturi carburetors.

An object of my invention is to provide an adapter applicable to any and all manifolds designed for use with four-venturi carburetors (which are available as original equipment on automobiles manufactured in the United States) and which effectively and efficiently mounts and/or connect two standard two-venturi carburetors of United States manufacture, particularly the above-noted 500 c.f.m. carburetor, thereto.

It is an object of my invention to provide an adapter of the character referred to which is such that a flow capacity of 1,000 c.f.m. of fuel and air can be advantageously obtained by means of two Holley 500 c.f.m. carburetors at a fraction of the cost of a single carburetor of 1,000 c.f.m. capacity and to establish a new carburetion system, utilizing highly efficient, small, two venturi carburetors which is considerably more efficient than a system which utilizes one carburetor.

In the ordinary four venturi carburetor and intake manifold assembly, the intake aperture in the manifold is divided in two sections by a partition and the carburetor is related to the aperture so that two of its venturi communicate with each of the sections. The above-noted dividing of the aperture and the relating of pairs of venturi thereto is accomplished so that the ratio of fuel and air discharged by the venturi of the carburetors into the manifold can be controlled by suitable adjustable metering means of the carburetors, related to the pairs of venturi and so that the ratio of fuel and air conducted to the cylinders of the engine related to the noted sections of the inlet aperture can be appropriately adjusted when the engine is being tuned.

While the above-noted dividing of the air inlet aperture and the controlled ducting of the flow of fuel and air to the cylinders of the engine is desirable, the noted pairing off and relating of specific carburetor venturi to the divided sections of the intake aperture is not only not critical, but is detrimental during high speed, high volume operation of the system.

It has been determined that free communication between the two divided sections of the inlet apertures of the manifold adjacent the venturi of the carburetor or carburetors, during high speed, high volume operation, is most effective and desirable and that to effect the desired adjustment and tuning of the ratio of fuel and air, which is effected at low speed, low volume operation, complete partitioning and pairing off of the inlet apertures and venturi is not necessary.

In certain special racing equipment it has been found that placement of an open blending or mixing chamber between the carburetor or carburetors and the divided or partitioned inlet aperture of a manifold greatly enhances the performance and efficiency of a carburetion system when operating under high speed, high volume conditions, but that such blending or mixing chambers creates what is referred to as "flat spots" and imparts such inefficiencies, when operation under low speed, low volume conditions, as to render them nearly inoperative.

In regards to the above, it has been determined that the prior art has gone too far in seeking efficiencies at the high speed, high volume end of the range of operation and has failed to accept or recognized a compromise wherein an effective blending can be obtained without loss of efficiency and the establishment of "flat spots" in the full anticipated and necessary range of operation.

An object of my invention is to provide an adapter of the character referred to which establishes communication between the partitioned sections of the inlet apertures of the manifold whereby a crossing over and blending of the air and fuel mixture directed by the carburetors for each section can take place during high speed, high volume operation and which is such that the flow of fuel and air issuing from each carburetor is effectively directed to the section of the manifold to which that carburetor is related during low speed, low volume operation and so that adjusting and tuning of the system, in accordance with normal and accepted practice, is not adversely affected.

It is an object of my invention to provide an adapter of the character referred to which is small, neat and compact and is such that the dimensions of the assembly of the adapter and the carburetors related to it is such that it can be effectively and conveniently received and arranged in that space which is provided in the engine compartment of an automobile and in which a conventional, stock, three- or four-venturi carburetor is normally received and arranged.

The foregoing objects and features of my invention will be fully understood from the following detailed description of a typical preferred form and application of my invention, throughout which description reference is made to the accompanying drawings, in which:

FIG. 8 is an enlarged, detailed, longitudinal sectional view of my new adapter;

FIG. 9 is a sectional view taken as indicated by line 9–9 on FIG. 8;

FIG. 10 is a sectional view taken substantially as indicated by line 10–10 on FIG. 8; and FIG. 11 is an enlarged, elevational view of a portion of the structure shown in FIG. 1.

The adapter A that I provide is a sectional unit comprising an upper section U and a lower section L. The lower section L is adapted to be cooperatively related to and engaged with an air intake manifold M and the upper section U is adapted to cooperatively engage and support a pair of like carburetors, there being a front carburetor C and a rear carburetor C'.

Figure 1:
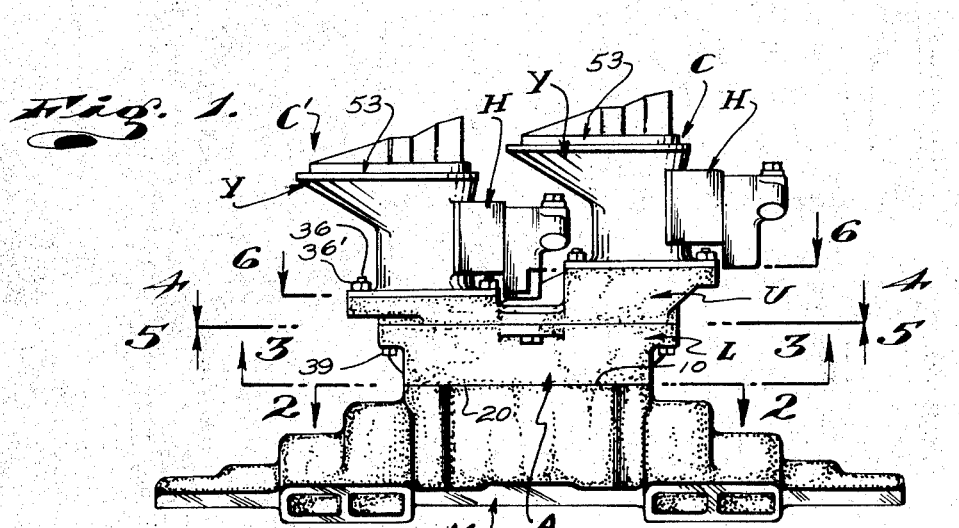
FIG. 1 is a side elevational view of my new adapter showing it related to a manifold and a pair of carburetors.
Figures 2, 3:
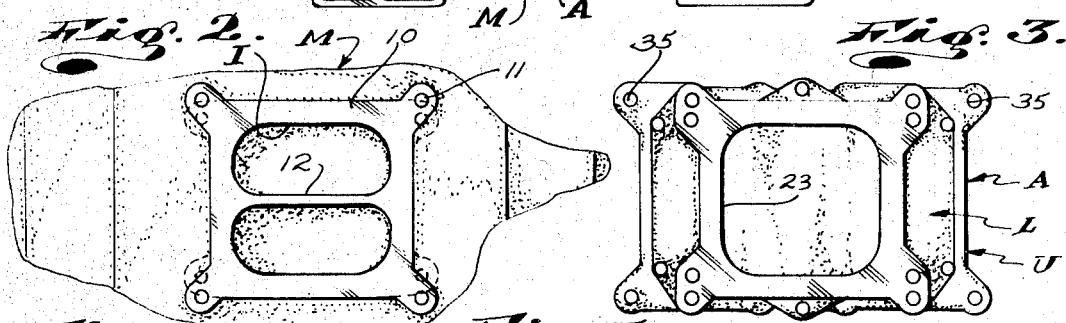
FIG. 2 is a sectional view taken substantially as indicated by line 2–2 on FIG. 1.
FIG. 3 is a view taken substantially as indicated by line 3–3 on FIG. 1.
Figures 4, 5:
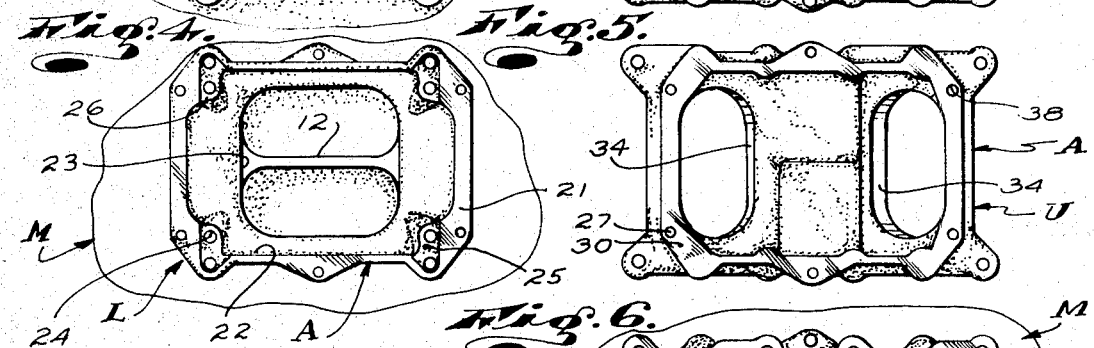
FIG. 4 is a sectional view taken substantially as indicated by line 4–4 on FIG. 1.
FIG. 5 is a sectional view taken substantially as indicated by line 5–5 on FIG. 1.
Figure 6:
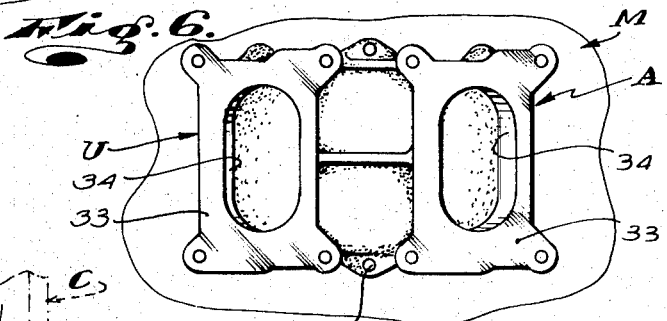
FIG. 6 is a sectional view taken substantially as indicated by line 6–6 on FIG. 1.

The manifold M shown in FIGS. 1 and 2 of the drawings is a standard, high performance, intake manifold designed to cooperatively mount and communicate with all four-venturi carburetors produced in the United States and employed as original equipment on new automobiles.

The manifold M has a central, flat, upwardly disposed carburetor mounting surface 10 of predetermined plane configuration and in which four carburetor mounting stud or fastener-receiving openings 11 enter. The openings 11 open upwardly in the surface 10 and are in a fixed predetermined pattern.

In practice, there are two basic and adapted patterns or openings 11, one being a wide pattern, such as is illustrated in full lines in FIG. 2 of the drawings, and the other being a narrow pattern which is indicated in dotted lines in FIG. 2.

All domestic manufacturers of four-venturi carburetors produce such carburetors with mounting stud or fastener-receiving openings to cooperatively receive mounting studs or fasteners in either or both of the patterns illustrated and referred to above.

The manifold M is further provided with and is characterized by an upwardly opening inlet aperture I opening at the central area of the surface 10 and divided into two sections by a central, longitudinally extending, vertical partition 12.

Under normal conditions, each section of the inlet aperture I defined by the partition 12 is related to and communicates with a pair of venturi of a related four-venturi carburetor and serves to direct the fuel-air mixture issuing from the related venturi to certain predetermined issuing from the related venturi to certain predetermined cylinders of a related engine. In the case of V-block engines, the partition serves to relate a pair of venturi (one low speed and one high speed venturi) to each bank of cylinders. Such a relationship of parts and controlled flow of fuel and air is intended to facilitate adjusting of the fuel-air mixture delivered to the engine cylinders during low speed, low volume operation of the intake system.

While most high rise type, high performance, four-barrel carburetor manifolds are provided with partitions, such as the partition 12 illustrated and described above, there are a number of manifolds of the size and capacity here concerned with which do not have such a partition. In such manifolds the inlet aperture is wide open and all four venturi discharge therein, without control.

The lower section L of the adapter A is a unitary shell-like part suitably cast or molded of aluminum or the like and is characterized by a flat, downwardly disposed bottom surface 20, a flat, upwardly disposed top surface 21, an upwardly opening, substantially rectangular shaped interior with downwardly and laterally inwardly curved, concave side walls or surface 22, and a discharge opening 23 arranged substantially centrally of the bottom surface 20.

The bottom surface 20 is of a predetermined plane configuration so that it will establish substantially complete flat bearing engagement on and with the top surfaces 10 of the several different makes of manifolds with which the adapter might be related.

The section L is further characterized by or includes eight vertically extending fastener-receiving openings 24 divided into two patterns of four openings each, each of which patterns corresponds with the one or the other of the patterns of mounting stud or fastener-receiving openings 11 in a related manifold.

The openings 24 enter the bottom surface 20 of the section U and open upwardly within the section at the top surfaces 25 of the combined recesses and protubrances 26 in the section, as clearly illustrated throughout the drawings. The surfaces 25 are spaced below the top surface 21 of the section U, a distance slightly greater than the axial extent or thickness of the heads 27' of bolt fasteners 27 which are engaged through one or the other of the pairs of openings and which are engaged in the openings 11 of the related manifold M, to mount and secure the section U to said manifold.

Figure 7:
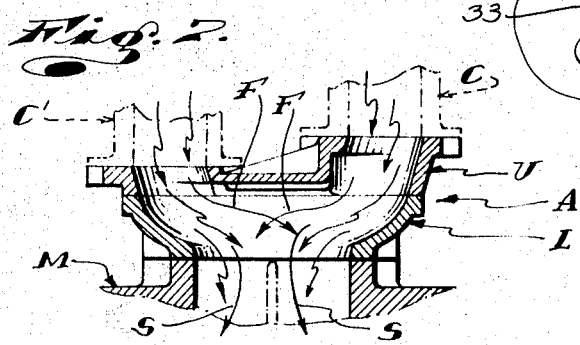
FIG. 7 is a diagrammatic sectional view of my new adapter.

The discharge opening 23 entering the bottom surface 20 corresponds in configuration with and is arranged to register with the inlet aperture I of manifold M, as clearly illustrated in FIGS. 2 and 7 of the drawings.

The section U is greater in longitudinal extent than in lateral extent and is such that the front and rear end portions of the interior surface 22 are inclined downwardly and inwardly at an angle considerably more acute with respect to horizontal than are the opposite side portions of said surface. The noted end portions of the interior surface are concave and are curved in such a manner as to effectively direct downwardly flowing air, at each end, downwardly and longitudinally inwardly to the discharge opening 23 and across the manifold aperture in immediate proximity to the areas of minus pressure in the manifold and defined by said aperture.

In addition to the foregoing, the section L is provided with laterally outwardly projecting flange portions about its exterior, adjacent the top surface 21 thereof and in which vertical fastener-receiving receiving openings 28 are established, which openings are adapted to cooperatively receive screw fasteners to secure the upper portion U to the lower section L.

The upper portion U of my adapter is an elongate, substantially flat, platelike part adapted to be engaged on or with and to cover and to close the lower section L. The section U has a flat downwardly disposed bottom surface 30 corresponding in inside and outside configuration with the top surface 21 of the section L and adapted to establish flat bearing and sealing engagement therewith.

In addition to the above the section U has and is characterized by front and rear upwardly projecting carburetor mounting pads 31 and 32 of dissimilar vertical extent or length and each has a flat, horizontal, upwardly disposed mounting surface 33 and an air inlet opening 34.

The mounting surface 33 of the pads 31 and 32 are alike and each is of the same, predetermined configuration of the corresponding mounting surface of a standard manifold designed to cooperatively receive and mount a standard two-venturi carburetor.

Further, the surfaces 31 and 32 are substantially rectangular in plane configuration and are provided with a 4-hole pattern of vertical fastener-receiving openings 35 (there being one such opening related to each corner portion of the surface) in which carburetor securing fasteners are related. In the case illustrated I have shown threaded studs 36 engaged in the openings 34 to project upwardly from the surface 33 and which are adapted to be engaged in registering openings in the base portions of related carburetors and to receive suitable nuts 36' for securing the carburetors to the pads.

The inlet openings 34 are elongate, transversely extending, vertically openings, the upper open ends of which occur in predetermined position in the surfaces 33 and within the patterns of fastener openings 35 related thereto and which establish open communication with the lower discharge or outlet end of the two-venturi carburetors related thereto. The openings 34 are preferably downwardly and longitudinally inclined to a slight or limited extent and the longitudinal outer and lateral end portions of the lower open ends thereof join the bottom surface 30 of the section U and join and fare into or with the upper edges of the end portions and the adjacent side portions of the interior surface 22 of the lower section U, when the sections L and U are assembled and related to each other, as clearly illustrated in FIGS. 8, 9 and 10 of the drawings.

The section U has downwardly opening vertical fastener-receivng openings 38 about its perimeter, which openings register with the openings 28 in the section L. Suitable screw fasteners 39 are engaged in and through the registering openings 28 —38 to hold the sections L and U in tight, clamped assembled relationship.

In the preferred carrying out of the invention and as illustrated in FIGS. 8 through 10 of the drawings, the bottom surface 30 of the upper section overlies the surfaces 25 established by the notches and protuberances 26 in the lower section U, a sufficient distance to accommodate the heads 27' of the fasteners 27 employed to secure the lower section U to the manifold M. With this relationship of parts, it will be apparent that the fasteners 27 are maintained captive in the assembled adapter by the upper section and the construction cannot become inadvertently disconnected from the manifold.

The carburetors C and C' shown in the drawings are similar in design and are representative of Holley 500 c.f.m. carburetors. Each is characterized by a base, mounting plate or flange 50 having a flat bottom surface 51 to oppose and establish bearing engagement on the surface 33 of a mounting pad. The flange 50 has a pattern of fastener-receiving receiving openings *(not shown) through which the fasteners or studs 36 on its related pad project. The studs 36 project upwardly through the openings in the flange and the nuts 36' on the studs serve to hold the flange tight on the pad.

The carburetors C and C' are next characterized by necklike venturi portions 52 which are substantially centrally arranged with respect to the flanges 50 and which project upwardly from the flanges, by float bowl, accelerator pump and metering device housings H at and projecting forwardly from the venturi portions 52 and upwardly divergent, upwardly opening intake horns 53 at the upper ends of the venturi portions 52.

The housings H have portions X forward of the flanges 50, which portions depend below the plane of the bottom surfaces 51 of the flanges 50. The horns 53 have rearwardly projecting portions Y defining rearwardly and downwardly disposed bottom surfaces 54 which project rearwardly beyond the rear sides or edges of the flanges 50 in vertical spaced relationship therewith.

In carrying out my invention, it is necessary that the carburetors C and C' be maintained as low as is possible and as close together, fore and aft, as is possible, so that they are maintained as close to the inlet aperture I as is possible and so that the chamber Z, defined by the sections L and U and which establish communication between the carburetor and the aperture I, is maintained as small as is practical and so that it does not establish what would be considered a turbulance chamber and interfere with the free flow of fuel and air from each carburetor to its related sections of the aperture I, during slow speed, low volume operation of the system.

In light of the above, the front and rear pads 31 and 32 are spaced apart longitudinally so that the venturi portions thereof are spaced apart a distance slightly greater than the distance and extent to which the housing H of the rear carburetors C' projecting forwardly from its venturi portion. The rear pad projects upwardly C' the top plane of the upper section U, defined by a wall 60 between the pads, a distance sufficient to accommodate the lower or depending portion X of the housing H of the rear carburetor C'.

The forward pad 31 projects upwardly from the top plane of the section U a greater distance than the pad 32 so that the portion Y of the horn 53 of the forward carburetor C projects freely, rearwardly above the housing H of the carburetor C', that is, so the housing H of the carburetor C' occurs in working spaced relationship below the bottom surface 54 of the horns of the forward carburetor.

In practice, the housings H have upper forward portions which project forwardly beyond the forward limits of the lower portions X therefor and the pads 31 and 32 are so arranged that the noted upper forward portion of the rear carburetor C' projects forwardly towards the venturi portion 52 of the carburetor C and between the flange 50 and portion Y of the horns 53 thereof.

With the above relationship of parts, it will be apparent that with the adapter that I provide, the front and rear carburetors C and C' are arranged in longitudinal and vertical spaced relationship so that their forwardly and rearwardly projecting parts and portions on their opposing front and rear sides are in free interengaged, meshed and/or lapped engagement with each other and so that the carburetors are in as close together relationship to each other as is possible and practice. It will be apparent that with the above relationship of parts the lower discharge ends of the carburetors, and the inlet openings 34 in the adapter are as close to being above and overlying the inlet aperture of the manifold as is possible and so that the extent to which the air and fuel flow down through the adapter must be moved laterally to enter the aperture I is maintained at a minimum and as near direct flow from the carburetor to manifold as is possible is maintained.

Referring to FIG. 7 of the drawings, when the system is in operation and a low volume of air and fuel is flowing through the adapter, the air and fuel flowing from each carburetor is directed so that substantially all of the fuel and air flows into the inlet aperture in a single column or stream and as indicated by the arrows S in the drawings. As a result of the above, adjusting and fine tuning of the carburetors can be effectively made. When the rate of operation of the system is increased and large, high velocity volumes of air are moved downwardly through the adapter, a certain balancing, crossover flow and mixing of the fuel and air from the two carburetors takes place in the chamber Z, as is indicated by the arrows F in FIG. 7 of the drawings. Such a crossover and blending or mixing of fuel and air is most desirable and results in superior performance during high speed, high volume operation of the construction.

It will be apparent that the adapter that I provide includes but two unitary, easy to produce castings or molded parts and a limited number of screw fasteners, and is such that it can be conveniently manufactured at little cost. It will be further apparent that the adapter is such that it can be easily, quickly and conveniently related to and with a manifold for four-venturi carburetors and a pair of two-venturi carburetors.

Still further, it will be apparent that with my new adapted, it is possible and practical to obtain and increase in fuel-air flow capacity which is equal to one large, costly and inefficient four-venturi carburetor with a pair of small, inexpensive and highly efficient two-venturi carburetors.

Having described only a typical preferred form and application of my invention, I do not wish to be limited or restricted to the specific details herein set forth, but wish to reserve to myself any modifications and/or variations which may appear to those skilled in the art.

I claim:

1. An adapter to mount and relate a pair of two-venturi carburetors to a four-venturi carburetor intake manifold comprising an elongate lower section with flat top and bottom surfaces, an upwardly opening cavity and a substantially central vertical outlet opening entering the bottom surface and communicating with the cavity, fastener means securing the lower section to a related manifold with the bottom surface engaging a mounting surface on said manifold and with the outlet opening registering with an inlet aperture in said mounting surface, a substantially flat, elongate upper section with a flat lower surface engaging the top surface of the lower section and overlying the cavity, longitudinally spaced front and rear, upwardly projecting mounting pads at the opposite ends of the upper section and having flat upwardly disposed carburetor mounting surfaces and vertical inlet openings entering said upper surfaces and communicating with the cavity, screw means securing the upper section to the lower section, front and rear carburetors with flat mounting flanges engaged on the mounting surfaces of the front and rear pads and having downwardly opening venturi passages communicating with the inlet openings and screw-fastening means securing the flanges to said pads.

2. A structure as set forth in claim 1 wherein said outlet opening is between and out of register with the inlet openings and said cavity has downwardly and inwardly inclined sides to direct air and fuel flowing downwardly through the inlet openings and into and through the cavity into the outlet opening.

3. A structure as set forth in claim 1 wherein said carburetors have central venturi portions projecting upwardly from their flanges, float and metering means housings projecting forwardly from their venturi portions and upwardly opening inlet horn portions at the upper ends of the venturi portions and projecting rearwardly from said venturi portions, the front pad being spaced forward of the rear pad a distance sufficient to accommodate the housing of the rear carburetor between the venturi portions of the carburetors, the plane of the mounting surface of the front pad being spaced above the plane of the mounting surface of the rear pad whereby the housing of the rear carburetor occurs below the inlet horn of the front carburetor.

4. A structure as set forth in claim 1 wherein said outlet opening is between and out of register with the inlet openings and said cavity has downwardly and inwardly inclined sides to direct air and fuel flowing downwardly through the inlet openings and into and through the cavity into the outlet opening, said carburetors having central venturi portions projecting upwardly from their flanges, float and metering means housing projecting forwardly from their venturi portions and upwardly opening inlet horn portions at the upper ends of the venturi portions and projecting rearwardly from said venturi portions, the front pad being spaced forward of the rear pad a distance sufficient to accommodate the housing of the rear carburetor between the venturi portions of the carburetors the plane of the mounting surface of the front pad being spaced above the plane of the mounting surface of the rear pad whereby the housing of the rear carburetor occurs below the inlet horn of the front carburetor.

5. A structure as set forth in claim 1 wherein said fastener means securing the lower section to the manifold compresses a plurality of vertical fastener openings in said lower section registering with threaded opening entering the mounting surface on said manifold and having upper ends opening in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures said screw-fastening means securing the carburetors to the pads including registering openings in the pads and the flanges and screw-fastening means engaged in and through said registering openings in the pads and flanges.

6. A structure as set forth in claim 1 wherein said outlet opening is between and out of register with the inlet openings and said cavity has downwardly and inwardly inclined sides to direct air and fuel flowing downwardly through the inlet openings and into and through the cavity into the outlet opening, said fastener means securing the lower section to the manifold compresses a plurality of vertical fastener openings in said lower section registering with threaded openings entering the mounting surface on said manifold and having upper ends opening in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures said screw-fastening means securing the carburetors to the pads including registering openings in the pads and the flanges and screw-fastening means engaged in and through said registering openings in the pads and flanges.

7. A structure as set forth in claim 1 wherein said carburetors have central venturi portions projecting upwardly from their flanges, float and metering means housings projecting forwardly from their venturi portions and upwardly opening inlet horn portions at the upper ends of the venturi portions and projecting rearwardly from said venturi portions, the front pad being spaced forward of the rear pad a distance sufficient to accommodate the housing of the rear carburetor between the venturi portions of the carburetors, the plane of the mounting surface of the front pad being spaced above the plane of the mounting surface of the rear pad whereby the housing of the rear carburetor occurs below the inlet horn of the front carburetor, said fastener means securing the lower section to the manifold compresses a plurality of vertical fastener openings in said lower section registering with threaded openings entering the mounting surface on said manifold and having upper ends opening in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures, said screw fastening means securing the carburetors to the pads including registering openings in the pads and the flanges and screw-fastening means engaged in and through said registering openings in the pads and flanges.

8. A structure as set forth in claim 1 wherein said outlet opening is between and out of register with the inlet openings and said cavity has downwardly and inwardly inclined sides to direct air and fuel flowing downwardly through the inlet openings and into and through the cavity into the outlet opening, said carburetors having central venturi portions projecting upwardly from their flanges, float and metering means housing projecting forwardly from their venturi portions and upwardly opening inlet horn portions at the upper ends of the venturi portions and projecting rearwardly from said venturi portions, the front pad being spaced forward of the rear pad a distance sufficient to accommodate the housing of the rear carburetor between the venturi portions of the carburetors, the plane of the mounting surface of the front pad being spaced above the plane of the mounting surface of the rear pad whereby the housing of the rear carburetor occurs below the inlet horn of the front carburetor, said fastener means securing the lower section to the manifold compresses a plurality of vertical fastener openings in said lower section registering with threaded openings entering the mounting surface on said manifold and having upper ends openings in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures, said screw fastening means securing the carburetors to the pads including registering openings in the pads and the flanges and screw fastening means engaged in and through said registering openings in the pads and flanges.

9. A structure as set forth in claim 1 wherein said fastener means securing the lower section to the manifold compresses a plurality of vertical fastener openings in said lower section registering with threaded opening entering the mounting surface on said manifold and having upper ends opening in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures, said screw-fastening means securing the carburetors to the pads including registering openings in the pads and the flanges and screw-fastening means engaged in and through said registering openings in the pads and flanges, the upper ends of the vertical fastener openings in said lower section occurring in spaced relationship below portions of the lower surface of said upper section, said bolts having heads positioned between the upper ends of the fastener openings and said lower surface and accessible when the upper section is removed from the lower section.

10. A structure as set forth in claim 1 wherein said outlet opening is between and out of register with the inlet openings and said cavity has downwardly and inwardly inclined sides to direct air and fuel flowing downwardly through the inlet openings and into and through the cavity into the outlet opening, said carburetors having central venturi portions projecting upwardly from their flanges, float and metering means housing projecting forwardly from their venturi portions and upwardly opening inlet horn portions at the upper ends of the venturi portions and projecting rearwardly from said venturi portions, the front pad being spaced forward of the rear pad a distance sufficient to accommodate the housing of the rear carburetor between the venturi portions of the carburetors, the plane of the mounting surface of the front pad being spaced above the plane of the mounting surface of the rear pad whereby the housing of the rear carburetor occurs below the inlet horn of the front carburetor, said fastener means securing the lower section to the manifold compresses a plurality of vertical fastener openings in said lower section registering with threaded openings entering the mounting surface on said manifold and having upper ends openings in said cavity and threaded bolts engaged through the fastener openings from the upper ends thereof and engaged in said threaded openings, said screw means securing the upper and lower sections together including outwardly projecting flange portions on said sections with registering apertures and screw fasteners engaged in and through said registering apertures, said screw-fastening means securing the carburetors to the pads including registering openings in the pads and the flanges and screw-fastening means engaged in and through said registering openings in the pads and flanges, the upper ends of the vertical fastener openings in said lower section occurring in spaced relationship below portions of the lower surface of said upper section, said bolts having heads positioned between the upper ends of the fastener openings and said lower surface and accessible when the upper section is removed from the lower section.